US012582150B2

(12) United States Patent　　(10) Patent No.:　US 12,582,150 B2
Kim et al.　　　　　　　　　　 (45) Date of Patent:　　Mar. 24, 2026

(54) OFFSHORE STRUCTURE SYSTEM AND OPERATION METHOD OF THE SAME

(71) Applicants: Shin Kim, Seongnam-si (KR); Kang Hak Lee, Seongnam-si (KR); Yungon Kim, Seogwipo-si (KR); Ingon Kim, Cheongju-si (KR); Ik Sung Hwang, Uijeongbu-si (KR); Han Hwang, Uijeongbu-si (KR)

(72) Inventors: Shin Kim, Seongnam-si (KR); Kang Hak Lee, Seongnam-si (KR); Yungon Kim, Seogwipo-si (KR); Ingon Kim, Cheongju-si (KR); Ik Sung Hwang, Uijeongbu-si (KR); Han Hwang, Uijeongbu-si (KR)

( * ) Notice: Subject to any disclaimer, the term of this patent is extended or adjusted under 35 U.S.C. 154(b) by 814 days.

(21) Appl. No.: 17/867,704

(22) Filed: Jul. 19, 2022

(65) Prior Publication Data

US 2023/0023190 A1　　Jan. 26, 2023

(30) Foreign Application Priority Data

Jul. 21, 2021　　(KR) ........................ 10-2021-0095751

(51) Int. Cl.
　　　*A23L 17/00*　　　(2016.01)
　　　*A22C 25/02*　　　(2006.01)
　　　　　　(Continued)

(52) U.S. Cl.
　　CPC ............ *A23N 17/004* (2013.01); *A22C 25/02* (2013.01); *A22C 25/17* (2013.01); *A22C 25/20* (2013.01); *A23L 17/70* (2016.08); *A23N 17/02* (2013.01)

(58) Field of Classification Search
　　CPC ........ A23L 13/10; A23L 13/432; A23L 17/10; A23L 17/70; A22C 25/02; A22C 25/20
　　　　　　(Continued)

(56) References Cited

U.S. PATENT DOCUMENTS 4,622,234 A * 11/1986 Okada ..................... A23L 17/70
　　　　　　　　　　　　　　　　　　　　　426/802
5,083,972 A * 1/1992 King .................... A22C 25/145
　　　　　　　　　　　　　　　　　　　　　452/108

(Continued)

FOREIGN PATENT DOCUMENTS

JP　　　2008-213665 A　　9/2008
KR　　　10-1142913 B1　　5/2012
　　　　　　(Continued)

OTHER PUBLICATIONS

KIPO, Office Action issued in Korean application No. 10-2021-0095751, Feb. 21, 2024, 12 pages.

*Primary Examiner* — David J Parsley
(74) *Attorney, Agent, or Firm* — Nicholas Park

(57) ABSTRACT

Proposed is an offshore structure system, the offshore structure system comprising: a loader configured to load fish caught from a fishing vessel on an offshore structure; a classification sensor configured to classify the fish by type; a fishmeal producer configured to produce fishmeal from the first kind of fish classified by the classification sensor; a collagen producer configured to produce collagen from the second type of fish classified by the classification sensor; a dough maker configured to generate fish meat dough by adding additive to the fishmeal and the collagen; and a food producer configured to produce food by heating the fish meat dough.

6 Claims, 6 Drawing Sheets

(51) Int. Cl.

| | | |
|---|---|---|
| *A22C 25/17* | (2006.01) | |
| *A22C 25/20* | (2006.01) | |
| *A23N 17/00* | (2006.01) | |
| *A23N 17/02* | (2006.01) | |

(58) Field of Classification Search
USPC .................... 426/513, 518, 646; 452/98, 161
See application file for complete search history.

(56)                       References Cited

U.S. PATENT DOCUMENTS

| | | | | |
|---|---|---|---|---|
| 6,096,367 | A * | 8/2000 | Hoashi ..................... | A23B 4/07 |
| | | | | 426/643 |
| 6,210,262 | B1 * | 4/2001 | Burch ................... | A22C 25/17 |
| | | | | 452/125 |
| 9,367,930 | B2 * | 6/2016 | Chamberlain ......... | A01K 73/10 |
| 2002/0022446 | A1 * | 2/2002 | Scherch ................ | A22C 25/08 |
| | | | | 452/194 |

FOREIGN PATENT DOCUMENTS

| | | | |
|---|---|---|---|
| KR | 10-2018-0065189 A | 6/2018 | |
| KR | 101874571 B1 | 7/2018 | |

* cited by examiner

OFFSHORE STRUCTURE SYSTEM AND OPERATION METHOD OF THE SAME

CROSS REFERENCE TO RELATED APPLICATION

This application claims the benefit of Korean Patent Application No. 10-2021-0095751, filed Jul. 21, 2021, which is hereby incorporated by reference in its entirety into this application.

BACKGROUND OF THE INVENTION

1. Technical Field

The present disclosure relates to an offshore structure system and an operation method of the same. More particularly, the present disclosure relates to an offshore structure system and an operation method of the same, wherein the offshore structure system and the operation method of the same is located in the sea and manufactures fishmeal by drying and pulverizing the fresh fish meat of the first type of fish secured by fishing vessels, produce food by mixing the obtained fishmeal with the collagen of the second type of fish and additive and then heating, and quickly supply food from the caught fish to long-term fishing vessels at sea or to consumers on land

2. Description of the Related Art

Recently, as living standards have improved and consumers' preferences for food have been diversified and upgraded, consumption of foods such as bread and sweets as a substitute for rice has increased significantly. Accordingly, various materials capable of improving nutrition, taste, and flavor have been researched and developed instead of flour generally used for bread or confectionery.

Collagen, the main protein of living things, is a substance that forms a fibrous or membranous structure as a component forming a gap between cells in a living body. Collagen has been industrially manufactured by extracting from livestock (cow, pig) or fish (fish bone, fish skin, blood). In recent years, fish collagen has been attracting attention in terms of safety.

On the other hand, fish caught in the seas of Korea have been manufactured, distributed and sold by drying or freezing. The fish that reached the consumer in this way ran rancid easily in the distribution process, so there was a problem that the taste of the consumer could not be satisfied.

In addition, it becomes difficult to secure food because fishing vessels to catch fish have to spend a long time on the sea after they depart. At this time, there is a demand for an offshore structure system capable of quickly manufacturing and supplying food such as bread or sweets using fresh fish from the sea to supply food for sailors.

DOCUMENT OF RELATED ART

Patent Document (Patent Document 1) Korean Patent No. 10-1874571" discloses "manufacturing method of bread and pastry using marine collagen" (published on Jun. 18, 2018)

The foregoing is intended merely to aid in the understanding of the background of the present disclosure, and is not intended to mean that the present disclosure falls within the purview of the related art that is already known to those skilled in the art.

SUMMARY OF THE INVENTION

An objective of the present disclosure is to provide an offshore structure system and an operation method of the same which may manufacture fishmeal using fish.

Another objective of the present disclosure is to provide an offshore structure system and an operation method of the same which may manufacture fertilizer using fish skin, scales, fish bones, blood and intestines.

Another objective of the present disclosure is to provide an offshore structure system and an operation method of the same which may manufacture a food through making a fish meat dough using the manufactured fishmeal.

Another objective of the present disclosure is to provide an offshore structure system and an operation method of the same which may provide food produced using fish to fishing vessels at sea.

To achieve this, an offshore structure system according to an embodiment of the present disclosure is comprising: a loader for loading fish caught from a fishing vessel on an offshore structure; a classification sensor for classifying the fish by type; a fishmeal producer for producing fishmeal from the first kind of fish classified by the classification sensor; a collagen producer for producing collagen from the second type of fish classified by the classification sensor; a dough maker for generating fish meat dough by adding additive to the fishmeal and the collagen; and a food producer for producing food by heating the fish meat dough.

In addition, the fishmeal producer is characterized in that it comprises, a first scale remover for separating the first type of fish to extract a first fish meat and a first fish skin; a first dryer for drying the first fish meat; and a pulverizer for producing fishmeal by pulverizing the first fish meat dried by the first dryer.

In addition, the collagen producer is characterized in that it comprises, a second scale remover for separating the second type of fish to extract a second fish meat and a second fish skin; a second dryer for drying the second fish meat and the second fish skin; a mixer for pulverizing the second fish meat and the second fish skin dried by the second dryer, and mixing with a solvent to produce a mixture; and an collagen extractor for extracting collagen by heating and aging the mixture.

In addition, the first dryer and the second dryer are characterized in that the drying using the sea wind or solar heat.

In addition, the pulverizer is characterized in that the dried first fish meat is pulverized to a particle size of 1000 μm or less. Preferably, the pulverizer may pulverize the dried first fish meat to a particle size of 200 μm or less, and more preferably, the pulverizer may pulverize the dried first fish meat to a particle size of 100 μm or less, similar to flour.

In addition, the fish meat dough generated by the dough maker is characterized in that the fishmeal is in a weight percent range of 60 to 80, the collagen is in a weight percent range of 15 to 35, and the additive is in a weight percent range of 5 to 25.

In addition, the additive is characterized in that it comprises at least one of sugar, butter, yeast, and salt.

In addition, the food producer is characterized in that it comprises a fermentator for fermenting the fish meat dough at room temperature for at least one hour, and heating the fermented fish meat dough at 160 degrees or higher for at least 20 minutes to produce a fishmeal bread.

In addition, the offshore structure system is characterized in that it further comprises a fertilizer producer for producing fertilizer using the surpluses of the fish remaining after being extracted by the fishmeal producer and the collagen producer.

The operation method of the offshore structure system according to an embodiment of the present disclosure is comprising the steps of: loading, by a loader, fish caught from a fishing vessel in the sea on an offshore structure; classifying, by a classification sensor, the fish by type; producing, by a fishmeal producer, fishmeal from the first type of fish classified by the classification sensor; producing, by a collagen producer, collagen from the second type of fish classified by the classification sensor, adding, by a dough maker, an additive to the fishmeal and the collagen to produce a fish meat dough; and producing, by a food producer, food by heating the fish meat dough the offshore structure system and operation method of the present disclosure have the effect of producing fishmeal using fish in the sea.

In addition, the offshore structure system and operation method of the same of the present disclosure have the effect of producing fertilizers using fish skin, scales, fish bones, blood and intestines of fish in the sea.

In addition, the offshore structure system and operation method of the same of the present disclosure have the effect of making a fish meat dough using fishmeal produced in the sea, and manufacturing food through this.

In addition, the offshore structure system and operation method of the same of the present disclosure have the effect of providing food produced using fish directly at sea to fishing vessels or to consumers located on land.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION OF THE INVENTION

Figure 1:
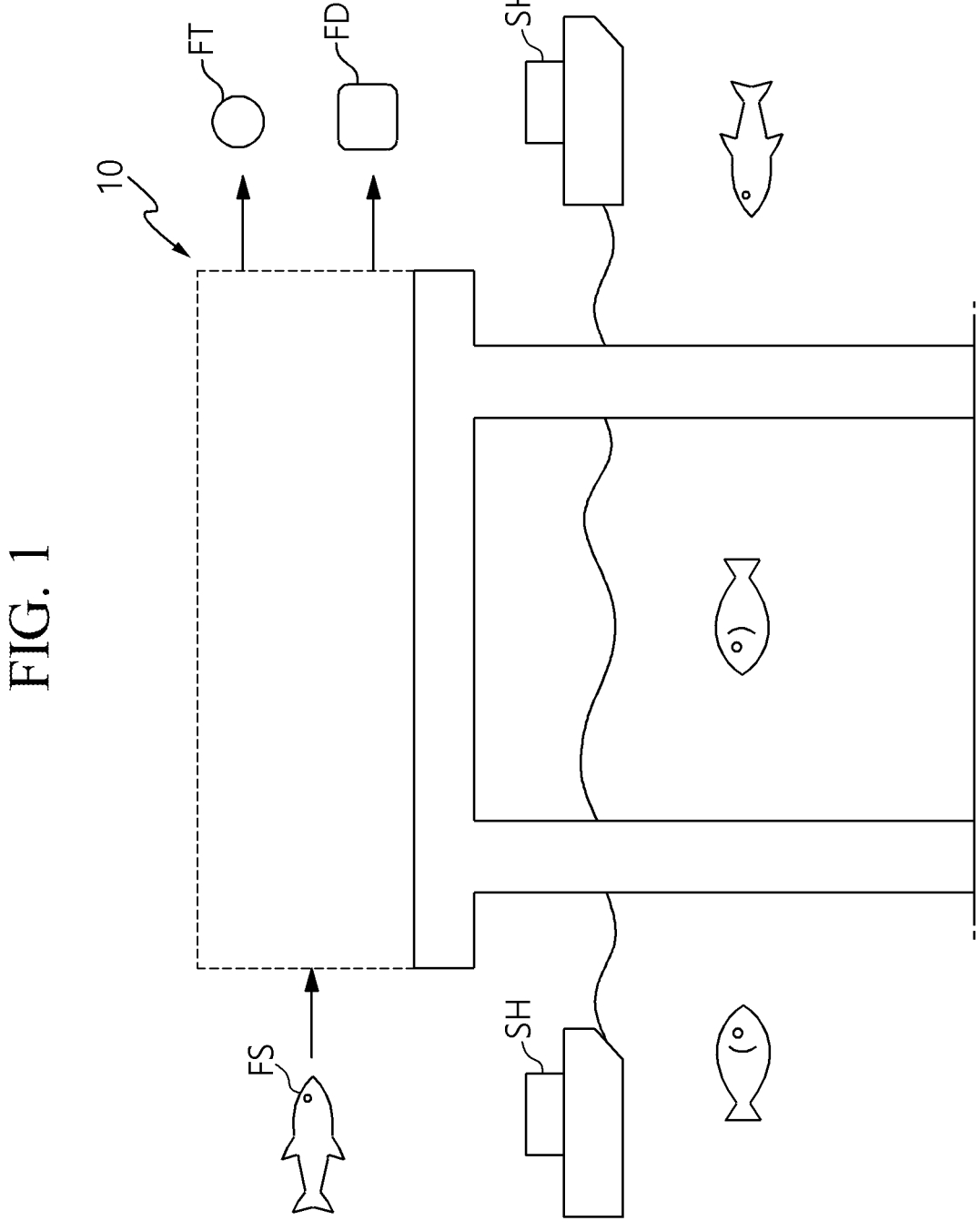
FIG. 1 is a view illustrating an offshore structure system according to the present disclosure.

Hereinafter, the present disclosure will be described in detail.

A variety of modifications may be made to the present disclosure and there are various embodiments of the present disclosure, examples of which will now be provided with reference to drawings and described in detail. However, the present disclosure is not limited thereto, and the exemplary embodiments can be construed as including all modifications, equivalents, or substitutes in a technical concept and a technical scope of the present disclosure. The similar reference numerals refer to the similar elements described in the drawings.

In addition, in the drawings, thicknesses, ratios, and dimensions of components are exaggerated for effective description of technical content. "And/or" may include any combination of one or more that the associated configurations may define.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

Terms such as first, second. may be used to describe various elements, but the elements should not be limited by the terms. The above terms are used only for the purpose of distinguishing one component from another. Without departing from the scope of the present invention, a first component may be referred to as a second component, and similarly, a second component may also be referred to as a first component. The singular expression may include the plural expression unless the context clearly dictates otherwise.

In addition, terms such as "below", "lower", "above", "upper" and the like are used to describe the relationship of the components shown in the drawings. The above terms are relative concepts, and are described with reference to directions indicated in the drawings.

Terms such as "comprise", "include" or "have" are intended to designate that a feature, number, step, action, component, part, or combination thereof described in the specification is present. It should be understood that the term does not preclude the possibility of addition or existence of one or more other features or numbers, steps, operations, components, parts, or combinations thereof.

Hereinafter, exemplary embodiments of the present disclosure will be described in detail with reference to the accompanying drawings. Hereinafter, the same elements in the drawings are denoted by the same reference numerals, and a repeated description of the same elements will be omitted.

That is, the present invention is not limited to the embodiments disclosed below, but may be implemented in various different forms. In the following description, when it is said that a certain part is connected to another part, this may include not only a case in which it is directly connected but also a case in which it is electrically connected with another element interposed therebetween. In addition, it should be noted that the same elements in the drawings are denoted by the same reference numbers and symbols as much as possible even if they are indicated in different drawings.

FIG. 1 is a view illustrating an offshore structure system 10 according to the present disclosure.

Referring to FIG. 1, the offshore structure system 10 of the present disclosure is a structure installed on the sea, and may be implemented in either a fixed or floating manner depending on water depth. In the present specification, the offshore structure system 10 is described as a fixed structure, but the present invention is not limited thereto, and may be implemented as a floating structure within the scope of achieving the object of the present disclosure. When installed in an area where the depth of the seabed is 500 m or less, the offshore structure system 10 may be implemented as a fixed type, but when installed in an area where the depth of the seabed is more than 500 m, the offshore structure system 10 may be implemented in a floating type.

In addition, according to an embodiment, the offshore structure system 10 may be implemented in a complex manner. In this case, the complex manner means that the center is implemented in a fixed manner, and the end of the bottom part implemented in a quadrilateral or hexagonal is implemented in a floating manner.

The offshore structure system 10 may be installed in a general sea area, but according to an embodiment, may be installed in a sea area where a fishery of various types of fish is formed.

The offshore structure system 10 may be provided with various types of fish FS from the fishing vessel SH in the sea. The offshore structure system 10 may be installed in an area where the fishery of fish which is the main material, is formed. Preferably, the offshore structure system 10 may be installed in a place where a warm current and a cold current meet. The offshore structure system 10 may product food FD using various types of fish FS. In addition, the offshore structure system 10 may produce the fertilizer FT using various types of fish FS.

The offshore structure system 10 may provide at least one of food FD and fertilizer FT to fishing vessels SH at sea or consumers on land. The present disclosure is not limited thereto, and according to the embodiment, the offshore structure system 10 may provide at least one of food FD and fertilizer FT to an aircraft including helicopter, and drone on the structure.

Through this, the offshore structure system 10 of the present disclosure produces food FD using fresh fish FS directly supplied from the fishing vessel SH, and provides the food FD, which is produced, on the fishing vessel SH or to consumers on land. Since the fishing vessel SH spends a long time on the sea, food materials may be directly supplied using the caught fish FS through the offshore structure system 10 of the present disclosure without the need to return to land.

Although not shown, the offshore structure system 10 may secure driving energy through an eco-friendly power generation system provided by itself. The offshore structure system 10 may include at least one power generation system of wind power, solar heat, tidal power, and wave power.

In addition, although not shown, the offshore structure system 10 may additionally comprise a decontamination facility for producing salt or a facility for desalination of seawater.

Figure 2:
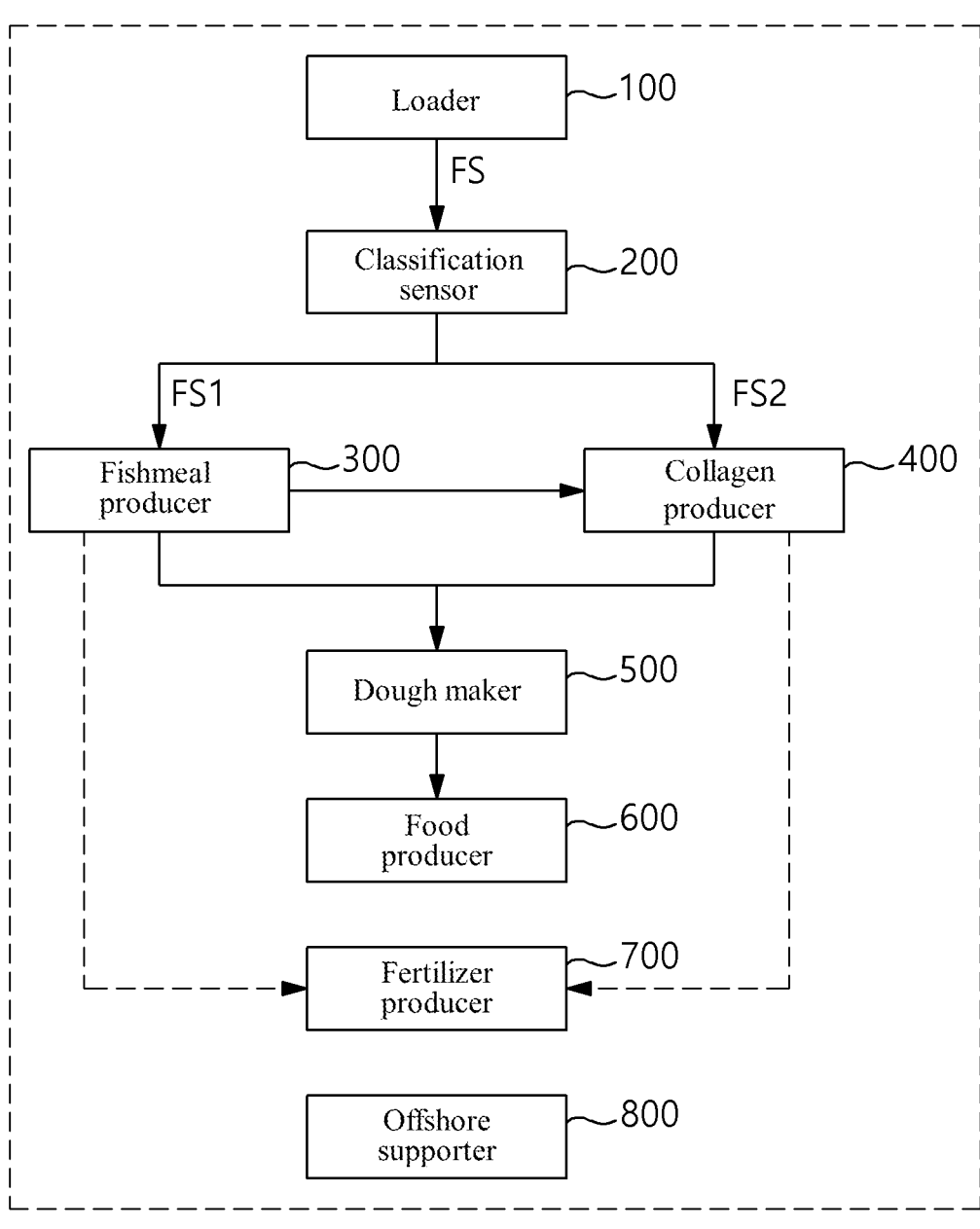
FIG. 2 is a view illustrating an offshore structure system according to the present disclosure.

FIG. 2 is a view illustrating the offshore structure system 10 according to the present disclosure.

Referring to FIG. 2, the offshore structure system 10 comprises a loader 100, a classification sensor 200, a fishmeal producer 300, a collagen producer 400, a dough maker 500, a food producer 600, a fertilizer producer 700, and an offshore supporter 800.

The loader 100 may load the fish caught from the fishing vessel on the offshore structure. The loader 100 may load by lifting the fish in the fishing vessel on the offshore structure system 10 using a lifting structure including a crane or an elevator.

The classification sensor 200 may classify the fish by type. The classification sensor 200 includes a sensor including a camera or a weight sensing sensor for detecting each type of fish, and may classify various types of fish by type using the sensor.

According to an embodiment, the classification sensor 200 may classify a first type of fish and a second type of fish from various types of fish. In this case, the first type of fish is a species suitable for edible fish meat, and may include types such as halibut, sea bass, trout, salmon, sea bream, yellowtail, tuna. The second type of fish is a species rich in collagen components, and may include types such as saury, shark, sunfish, eel.

The fishmeal producer 300 may produce fishmeal from the first type of fish classified by the classification sensor 200. The fishmeal producer 300 may extract fish meat from the first type of fish, dry and pulverize the fish meat to produce fishmeal. The fishmeal, which is obtained in this way, is a high-quality protein raw material with high digestibility, high energy value, and excellent nutrient content and components such as protein, fat, minerals, and vitamins.

The collagen producer 400 may produce collagen from the second type of fish classified by the classification sensor 200. The collagen producer 400 may extract fish meat and fish skin from the second type of fish and produce collagen. According to an embodiment, the collagen producer 400 may receive the fish skin of the first type of fish separated by the fishmeal producer 300 and produce collagen using the fish skin of the first type of fish.

The dough maker 500 may generated fish meat dough by adding additive to fishmeal and collagen. The fish meat dough generated by the dough maker 500 may be composed of fishmeal in a weight percent range of 60 to 80, collagen in a weight percent range of 15 to 35, and additive in a weight percent range of 5 to 25 percent. In addition, the additive may include at least one of sugar, butter, yeast and salt.

The food producer 600 may produce food by heating the fish meat dough.

The fertilizer producer 700 may produce fertilizer using the surpluses of the fish remaining after being extracted by the fishmeal producer 300 and the collagen producer 400. The fertilizer producer 700 may produce fertilizer by drying and pulverizing surpluses including fish bones, intestines, and blood of fish.

The offshore support 800 may fix offshore structures on the sea. The marine support 800 may fix the marine structure to the sea in a fixed or floating manner.

Figure 3:
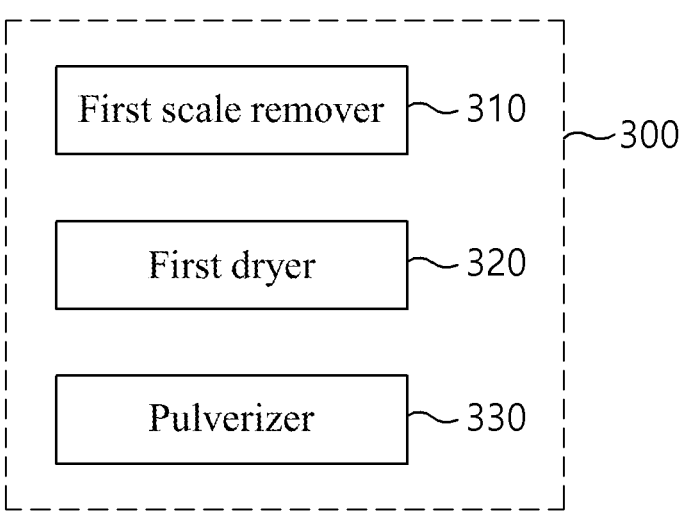
FIG. 3 is a view illustrating a fishmeal producer according to the present disclosure.

FIG. 3 is a view illustrating a fishmeal producer 300 according to the present disclosure.

Referring to FIG. 3, the fishmeal producer 300 may comprise a first scale remover 310, a first dryer 320, and a pulverizer 330.

The first scale remover 310 may separate the first type of fish to extract the first fish meat and the first fish skin. The first scale remover 310 may comprise a fish skin remover, an intestine remover, and a fish bone remover to extract the first fish meat of the first type of fish. The fish skin remover may operate to extract the first fish skin, and the intestine remover and the fish bone remover may operate to extract the first fish meat of the first type of fish. The first fish skin may be utilized for collagen production.

The first scale remover 310 may remove the scales from the first fish skin. The fish skin remover of the first scale remover 310 of the present disclosure may use a sodium hydroxide solution to simply and effectively remove the scales attached to the first fish skin since the sodium hydroxide solution softens the scales or the skin of the fish. At this time, the first scale remover 310 may remove the scales attached to the fish skin by putting the first fish skin from which foreign substances are removed into 0.1 to 0.2 M sodium hydroxide solution.

The first dryer 320 may dry the first fish meat. The first dryer 320 may be disposed on the offshore structure to dry the first fish meat using the sea wind or solar heat. Through this, the first dryer 320 of the present disclosure may minimize energy consumption.

The pulverizer 330 may pulverize the first fish meat, which is dried by the first dryer 320, to produce fishmeal. The pulverizer 330 may pulverize the dried first fish meat to a particle size of 1000 μm or less.

Preferably, the pulverizer 330 may pulverize the dried first fish meat to a particle size of 200 μm or less, and more preferably, the pulverizer 330 may pulverize the dried first fish meat to a particle size of 100 μm or less, similar to flour. Through this, the pulverizer 330 according to the embodiment of the present disclosure may produce higher quality fishmeal.

According to an embodiment, the pulverizer 330 may pulverize to different particle sizes depending on the species of fish. The pulverizer 330 may pulverize fish meat having a high fat content including tuna, salmon, yellowtail to a first particle size. The pulverizer 330 may pulverize fish meat having a low fat content including halibut, eel, sea bream to a second particle size smaller than the first particle size. Through this, the fishmeal producer 300 of the present disclosure may pulverize the fish meat of the fish having a low fat content to a more dense particle size, thereby improving the texture and taste of the finally prepared food.

According to an embodiment, the pulverizer 330 may perform a defatting process on fish meat of fish having a high fat content.

Figure 4:
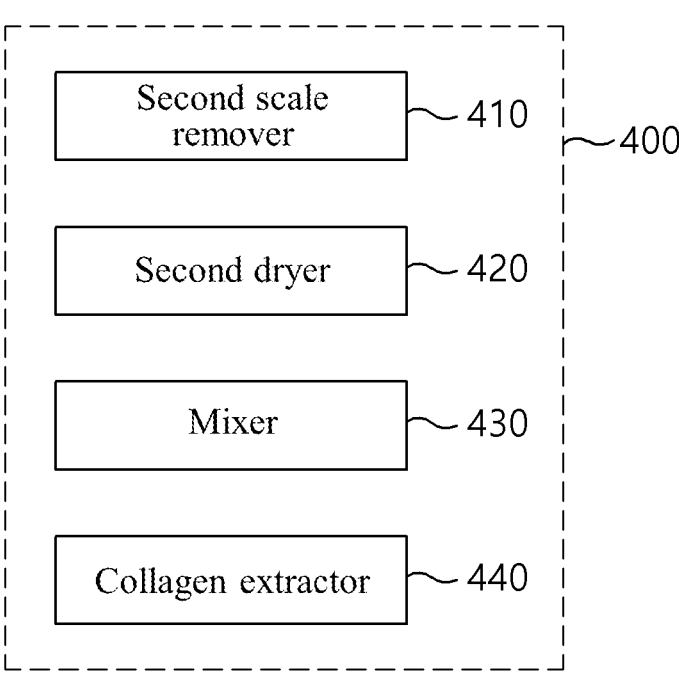
FIG. 4 is a view illustrating a collagen producer according to the present disclosure.

FIG. 4 is a view illustrating the collagen producer 400 according to the present disclosure.

Referring to FIG. 4, the collagen producer 400 may include a second scale remover 410, a second dryer 420, a mixer 430, and an collagen extractor 440.

The second scale remover 410 may separate the second type of fish to extract the second fish meat and the second fish skin. The second scale remover 410 may comprise a fish skin remover, an intestine remover, and a fish bone remover to extract the second fish meat and the second fish skin of the second type of fish.

The second scale remover 410 may remove the scales from the second fish skin. The fish skin remover of the second scale remover 410 of the present disclosure may use a sodium hydroxide solution to simply and effectively remove the scales attached to the second fish skin since the sodium hydroxide solution softens the scales or the skin of the fish. At this time, the second scale remover 410 may remove the scales attached to the fish skin by putting the second fish skin from which foreign substances are removed into 0.1 to 0.2 M sodium hydroxide solution.

The second dryer 420 may dry the second fish meat and the second fish skin. The second dryer 420 may use the sea wind or solar heat to dry the second fish meat and the second fish skin. Through this, the second dryer 420 of the present disclosure may minimize energy consumption. According to an embodiment, the second dryer 420 may additionally dry the first fish skin provided from the first scale remover 310 (see FIG. 3).

The mixer 430 may pulverize the dried second fish meat and the second fish skin, and mix it with a solvent to produce a mixture. The mixer 430 pulverizes to 50 to 150 mesh particle size, and the mixer 430 may mix the pulverized material and the solvent in a mass ratio of 1:1. In this case, the solvent may include at least one of water, alcohol, and oil. According to an embodiment, the mixer 430 may additionally pulverize the first fish skin, which is dried, and add it to the mixture.

The mesh particle size refers to a name for grading the size of particles, and is a standardized measure in the UK as a method of grading by the size of a sieve when sieving particles. It is expressed as the number of eyes (mesh) per inch of length.

The collagen extractor 440 may extract collagen by heating and aging the mixture. The collagen extractor 440 may extract collagen by heating the mixture in a range of 90 to 100 degrees Celsius for 5 minutes or more, and aging it at room temperature for 30 minutes or more.

Figure 5:
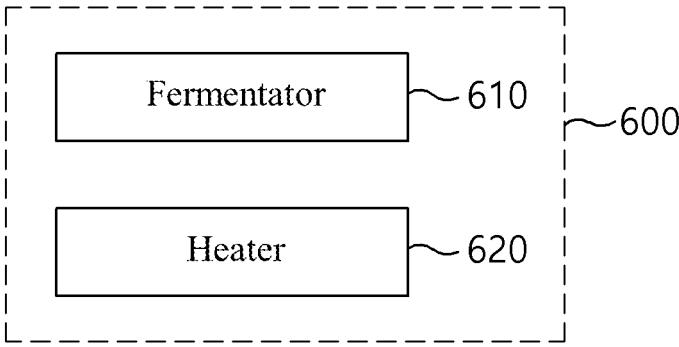
FIG. 5 is a view illustrating a food producer according to the present disclosure.

FIG. 5 is a view illustrating the food producer 600 according to the present disclosure.

Referring to FIG. 5, the food producer 600 may include a fermentator 610 and a heater 620.

The fermentator 610 may ferment the fish meat dough at room temperature for at least one hour. In this process, yeast reproduces in the dough until the oxygen is gone, consuming the sugar in the dough, which can improve the flavor of the food.

The heater 620 may produce fishmeal bread by heating the fish meat dough at 160 degrees or more for at least 20 minutes. The heater 620 may be provided with a heating mechanism including an oven to heat the fish meat dough which is fermented and then produce the fishmeal bread.

Figure 6:
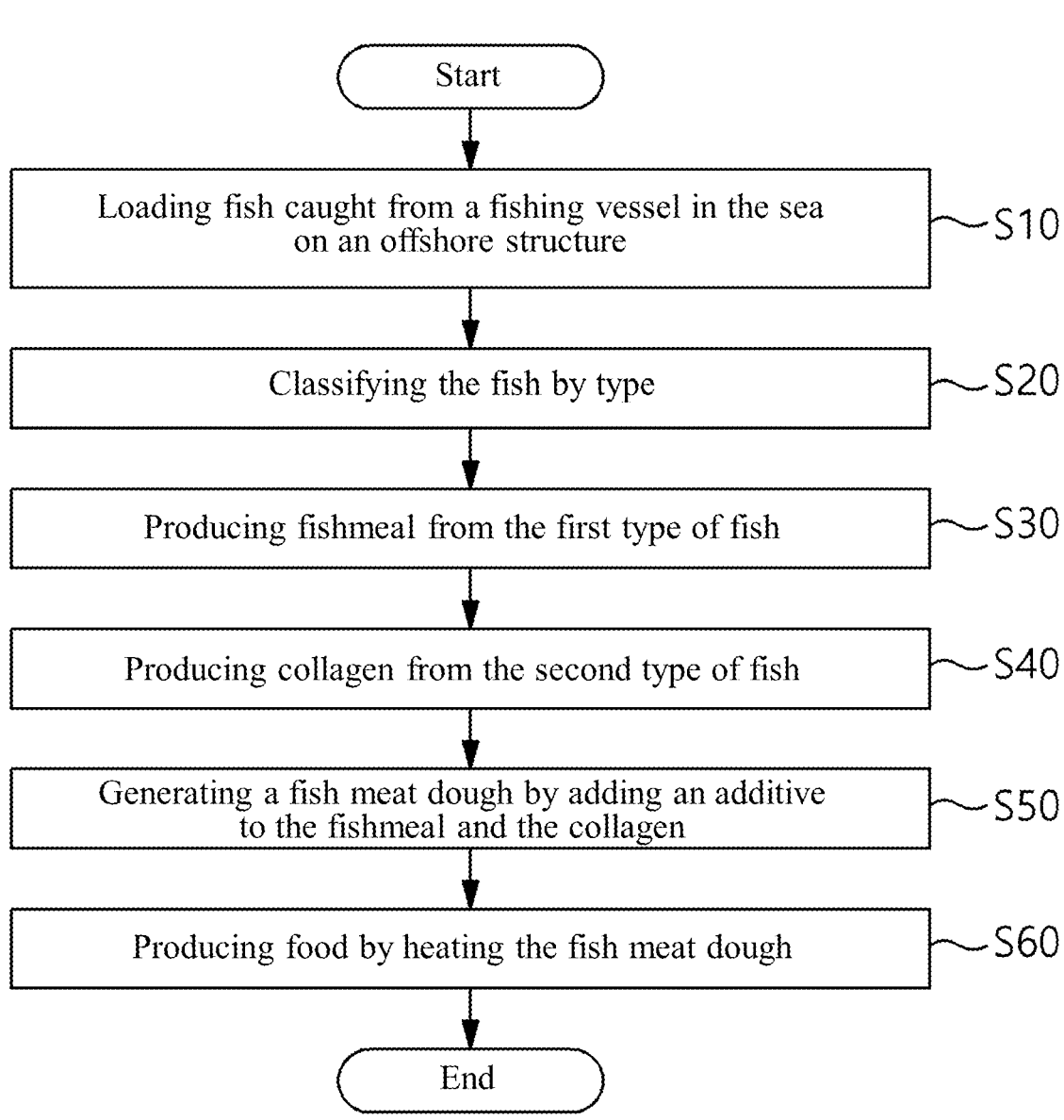
FIG. 6 is a flow chart illustrating an operation method of the offshore structure system according to the present disclosure.

FIG. 6 is a flow chart illustrating the operation method of the offshore structure system according to the present disclosure.

Hereinafter, with reference to FIGS. 1 to 6, the operation method of the offshore structure system 10 of the present disclosure will be described.

First, at step S10 the loader 100 may load the fish caught from the fishing vessel on the offshore structure. That is, the loader 100 may use a crane device installed on the offshore structure to load the fish in the adjacent fishing vessel on the offshore structure system 10. The fish may be delivered to the classification sensor 200 by a conveyor belt or the like.

At step S20, the classification sensor 200 may classify the fish by type. That is, the classification sensor 200 may detect images and weights of various types of fish by using the sensor, and classify the fish by type based on this. In this case, the classification sensor 200 may classify the fish using a pre-established AI (artificial intelligence) classification model. According to an embodiment, the classification sensor 200 may classify the fish of the first type and the fish of the second type. In this case, the first type of fish is a species suitable for edible fish meat, and may include types such as halibut, sea bass, trout, salmon, sea bream, yellowtail, and tuna. The second type of fish is a species rich in collagen components, and may include types such as saury, shark, sunfish, and eel.

At step S30, the fishmeal producer 300 may produce fishmeal from the first type of fish classified by the classification sensor 200. That is, the fishmeal producer 300 may extract fish meat by removing the intestines, fish skin, fish bones, and blood of the first type of fish, and dry and pulverize the fish meat to production fish meal.

At step S40, the collagen producer 400 may produce collagen from the second type of fish classified by the classification sensor 200. That is, the collagen producer 400 may remove the intestines, fish bones, and blood of the second type of fish to extract fish meat and fish skin, and produce collagen. According to an embodiment, the collagen producer 400 may receive the fish skin of the first type separated by the fishmeal producer 300 and produce collagen using the fish skin of the first type.

At step S50, the dough maker 500 may generate fish meat dough by adding additive to fish meal and collagen. That is, the fish meat dough generated by the dough maker 500 may be consist of fish meal in a weight percent range of 60 to 80, collagen in a weight percent range of 15 to 35, and additive in a weight percent range of 5 to 25 percent. In addition, the additive may include at least one of sugar, butter, yeast and salt.

At step S60, the food producer 600 may produce food by heating the fish meat dough. That is, the food producer 600 may produce fishmeal bread by subdividing the fish meat dough, fermenting and heating the subdivided dough.

Through the above description, the offshore structure system and operation method of the present disclosure have the effect of producing fishmeal using fish in the sea.

In addition, the offshore structure system and operation method of the same of the present disclosure have the effect of producing fertilizers using fish skin, scales, fish bones, blood and intestines of fish in the sea.

In addition, the offshore structure system and operation method of the same of the present disclosure have the effect of making a fish meat dough using fishmeal produced in the sea, and manufacturing food through this.

In addition, the offshore structure system and operation method of the same of the present disclosure have the effect of providing food produced using fish directly at sea to fishing vessels or to consumers located on land.

The embodiments of the subject matter described herein may be realized as one or more computer program products, that is, one or more modules related to computer program commands encoded on a tangible program medium for execution by a data processing device or for controlling the operation of the data processing device. The tangible program medium may be a radio signal or a computer-readable medium. The radio signal is an artificially generated signal, a machine-generated electrical, optical, or electromagnetic signal, which is generated to encode information for transmission to a suitable receiver device for execution by a computer. The computer-readable medium may be a machine-readable storage device, a machine-readable storage substrate, a memory device, a combination of materials that affect a machine-readable radio signal, or a combination of one or more thereof.

A computer program (also known as a program, software, software application, script, or code) may be written in any form of programming language including compiled or interpreted languages, or priori or procedural languages. The computer program may be deployed in any form, including a standalone program or a module, component, subroutine, or other units suitable for use in a computer environment.

The computer program does not necessarily correspond to a file of a file device. The computer program may be stored in a single file dedicated to the program in question, or in multiple coordinated files (files that store one or more modules, subprograms, or portions of code), or in a portion of a file that holds other programs or data (one or more scripts stored in a markup language document).

The computer program may be deployed to be executed on one computer or on multiple computers that are located at one site or distributed across multiple sites and interconnected by a communication network.

Additionally, the logic flows and the structural block diagrams herein describe an act and/or a specific method supported by functions and steps supported by the disclosed structural means. The logic flows and the structural block diagrams can be used to set corresponding software structures and algorithms and their equivalents.

The processes and logic flows described herein may be performed by one or more programmable processors executing one or more computer programs to perform functions by operating on received data and generating output.

The processors suitable for the execution of the computer program include, both general purpose and special purpose microprocessors and any one or more processors of any kind of digital computer. Generally, a processor will receive instructions and data from read-only memory or random-access memory or both.

The essential elements of a computer are one or more memory devices for storing instructions and data, and a processor for performing the instructions. In addition, generally, a computer may receive data from or transmit data to one or more large storage devices for storing data, such as magnetic, magneto-optical, or optical disks, or may be coupled to or may include the large storage devices so as to perform both receiving and transmitting operations. However, the computers do not need to have the devices.

The present description provides the best mode of the present disclosure to describe the present disclosure, and provides an example for enabling those skilled in the art to manufacture and use the present disclosure. The specification does not limit the present disclosure to the specific terms presented.

Although the present disclosure has been described for illustrative purposes, those skilled in the art will appreciate that various modifications, additions, and substitutions are possible, without departing from the scope and spirit of the present disclosure. In short, to achieve the intended effect of the present disclosure, it is not necessary to include all functional blocks shown in the drawings, or to follow all the sequences shown in the drawings in the order as shown therein. Note that even if it is not, it may fall within the technical scope of the present disclosure disclosed in the claims.

What is claimed is:

1. An offshore structure system comprising:
   a loader configured to load fish caught from a fishing vessel on an offshore structure;
   a classification sensor configured to classify the fish into a first type of fish and a second type of fish;
   a fishmeal producer configured to produce fishmeal from the first type of fish classified by the classification sensor;
   a collagen producer configured to produce collagen from the second type of fish classified by the classification sensor;
   a dough maker configured to generate fish meat dough by adding additive to the fishmeal and the collagen; and
   a food producer configured to produce food by heating the fish meat dough,
   wherein the fishmeal producer comprises:
   a first scale remover configured to separate the first type of fish to extract a first fish meat and a first fish skin;
   a first dryer configured to dry the first fish meat; and
   a pulverizer configured to produce fishmeal by pulverizing the first fish meat dried by the first dryer,
   wherein the collagen producer comprises:
   a second scale remover configured to separate the second type of fish to extract a second fish meat and a second fish skin;
   a second dryer configured to dry the second fish meat and the second fish skin;
   a mixer configured to pulverize the second fish meat and the second fish skin dried by the second dryer, and mixing with a solvent to produce a mixture; and
   a collagen extractor configured to extract collagen by heating and aging the mixture,
   wherein the first dryer and the second dryer are drying using sea wind or solar heat.

2. The offshore structure system of claim 1, wherein the pulverizer pulverizes the dried first fish meat to a particle size of 1000 μm or less.

3. The offshore structure system of claim 2, wherein the fish meat dough generated by the dough maker consists of the fishmeal in a weight percent range of 60 to 80, the collagen in a weight percent range of 15 to 35, and the additive in a weight percent range of 5 to 25.

4. The offshore structure system of claim 3, wherein the additive comprises at least one of sugar, butter, yeast, and salt.

5. The offshore structure system of claim 4, wherein the food producer comprises:

a fermentator configured to ferment the fish meat dough at room temperature for at least one hour; and a heater configured to heat the fermented fish meat dough at 160 degrees or higher for at least 20 minutes to produce a fishmeal bread.

6. The offshore structure system of claim 5, wherein the offshore structure system further comprises:

a fertilizer producer configured to produce fertilizer using the surpluses of the fish remaining after being extracted by the fishmeal producer and the collagen producer.

\* \* \* \* \*